United States Patent
Dai et al.

(10) Patent No.: US 8,379,994 B2
(45) Date of Patent: Feb. 19, 2013

(54) DIGITAL IMAGE ANALYSIS UTILIZING MULTIPLE HUMAN LABELS

(75) Inventors: Shengyang Dai, San Jose, CA (US); Su Wang, San Jose, CA (US); Akira Nakamura, San Jose, CA (US); Takeshi Ohashi, Kanagawa (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/904,138

(22) Filed: Oct. 13, 2010

(65) Prior Publication Data

US 2012/0093396 A1   Apr. 19, 2012

(51) Int. Cl.
G06K 9/62 (2006.01)
(52) U.S. Cl. ........ 382/224; 382/158; 382/159; 382/160; 382/161
(58) Field of Classification Search .................. 382/155, 382/156, 157, 158, 159, 160, 161, 176, 177, 382/178, 179, 180, 181–194, 224–231
See application file for complete search history.

(56) References Cited

U.S. PATENT DOCUMENTS

| | | | |
|---|---|---|---|
| 7,627,171 B2 * | 12/2009 | Hampshire et al. | 382/173 |
| 8,073,254 B2 * | 12/2011 | Saptharishi et al. | 382/173 |
| 2005/0002572 A1 * | 1/2005 | Saptharishi et al. | 382/224 |

* cited by examiner

Primary Examiner — Brian Le
(74) Attorney, Agent, or Firm — Haverstock & Owens LLP

(57) ABSTRACT

Systems and methods for implementing a multi-label image recognition framework for classifying digital images are provided. The provided multi-label image recognition framework utilizes an iterative, multiple analysis path approach to model training and image classification tasks. A first iteration of the multi-label image recognition framework generates confidence maps for each label, which are shared by the multiple analysis paths to update the confidence maps in subsequent iterations. The provided multi-label image recognition framework permits model training and image classification tasks to be performed more accurately than conventional single-label image recognition frameworks.

9 Claims, 12 Drawing Sheets

DIGITAL IMAGE ANALYSIS UTILIZING MULTIPLE HUMAN LABELS

TECHNICAL FIELD

The present disclosure relates to systems and methods for classifying digital image data.

BACKGROUND

Conventional computer-implemented feature extraction image classification methods utilize human labor to individually examine and label digital images. The digital images are labeled by humans with ground truths representing the classification of each pixel or region of pixels. The labeled images are then used to build models to automatically classify the features of new images. Conventional classification algorithms rely on a single ground truth for the algorithm to learn, which corresponds to a desirable final output of the recognition algorithm. This type of single label framework is straightforward. However, the human intelligence integrated into a conventional learning algorithm is greatly limited by the use of a single ground truth and the necessarily serial way in which human intelligence functions.

What is needed are methods and systems for performing image analysis that utilize multiple ground truths in parallel. Moreover, what is further needed are methods and systems that improve performance and the reliability of results by taking advantage of the benefits of parallel processing of the multiple ground truths.

SUMMARY

Methods and systems disclosed herein provide for the integration of multiple human labels, or ground truths, into a single image analysis framework. One embodiment consistent with the disclosure permits a multi-label image recognition framework to classify images based on multiple classification models, each model associated with a different ground truth. A computer-implemented feature extraction method for classifying pixels of a digitized image to be performed by a system comprising at least on processor and at least one memory comprises the steps of generating a plurality of characterized pixels from a digitized image; generating a plurality of classification models by associating features of the plurality of characterized pixels with labels of a plurality of ground truths, wherein each of the plurality of ground truths is associated with a respective one of a plurality of image classifications; determining by the system a plurality of confidence maps based on the plurality of classification models, wherein the confidence maps contain information representing a likelihood of each pixel in the digitized image belonging to one of the plurality of image classifications; and iteratively improving the plurality of classification models by (a) extracting a plurality of contextual image feature vectors from the most-recently generated plurality of confidence maps, (b) updating the plurality of classification models based on the most-recently extracted plurality of contextual image feature vectors, and performing steps a and b for a threshold number of iterations; and outputting by the system a plurality of final classification models that classify part or all pixels of the digitized image.

Another embodiment consistent with the with the disclosure permits a multi-label image recognition framework to train classification models, each model associated with a different ground truth, to classify the pixels of a digitized image. A computer-implemented feature extraction method for classifying pixels of a digitized image to be performed by a system comprising at least one processor and at least one memory comprises the steps of generating a plurality of characterized pixels from a digitized image; determining by the system a plurality of confidence maps by applying a plurality of classification models to features of the plurality of characterized pixels, wherein a confidence map contains information representing likelihoods of the characterized pixels belonging to a respective one of a plurality of classifications and a classification model associates features of the plurality of characterized pixels with a respective one of the plurality of classification; and iteratively improving the plurality of confidence maps by (a) extracting a plurality of contextual image feature vectors from the most-recently generated plurality of confidence maps, (b) updating the plurality of confidence maps based on the most-recently extracted plurality of contextual image feature vectors, and performing steps a and b for a threshold number of iterations; and outputting by the system a plurality of final confidence maps that classify part or all of the pixels of the digitized image.

BRIEF DESCRIPTION OF DRAWINGS

The accompanying drawings, which are incorporated in and constitute a part of this specification, illustrate the invention and, together with the description, serve to explain the principles of the invention.

DETAILED DESCRIPTION

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the inventions and it is to be understood that other embodiments may be utilized and that changes may be made without departing from the scope of the present invention. The following detailed description, therefore, is not to be taken in a limited sense. The exemplary multiple ground truth image analysis techniques presented here may refer to specific examples for illustration purposes. It is understood that these image recognition techniques are not limited to use with any particular class or type of digital images.

Exemplary systems and methods disclosed herein use a multi-label iterative image recognition framework to improve performance of automated or semi-automated feature extraction over that of a single-label image recognition framework.

Figure 1:
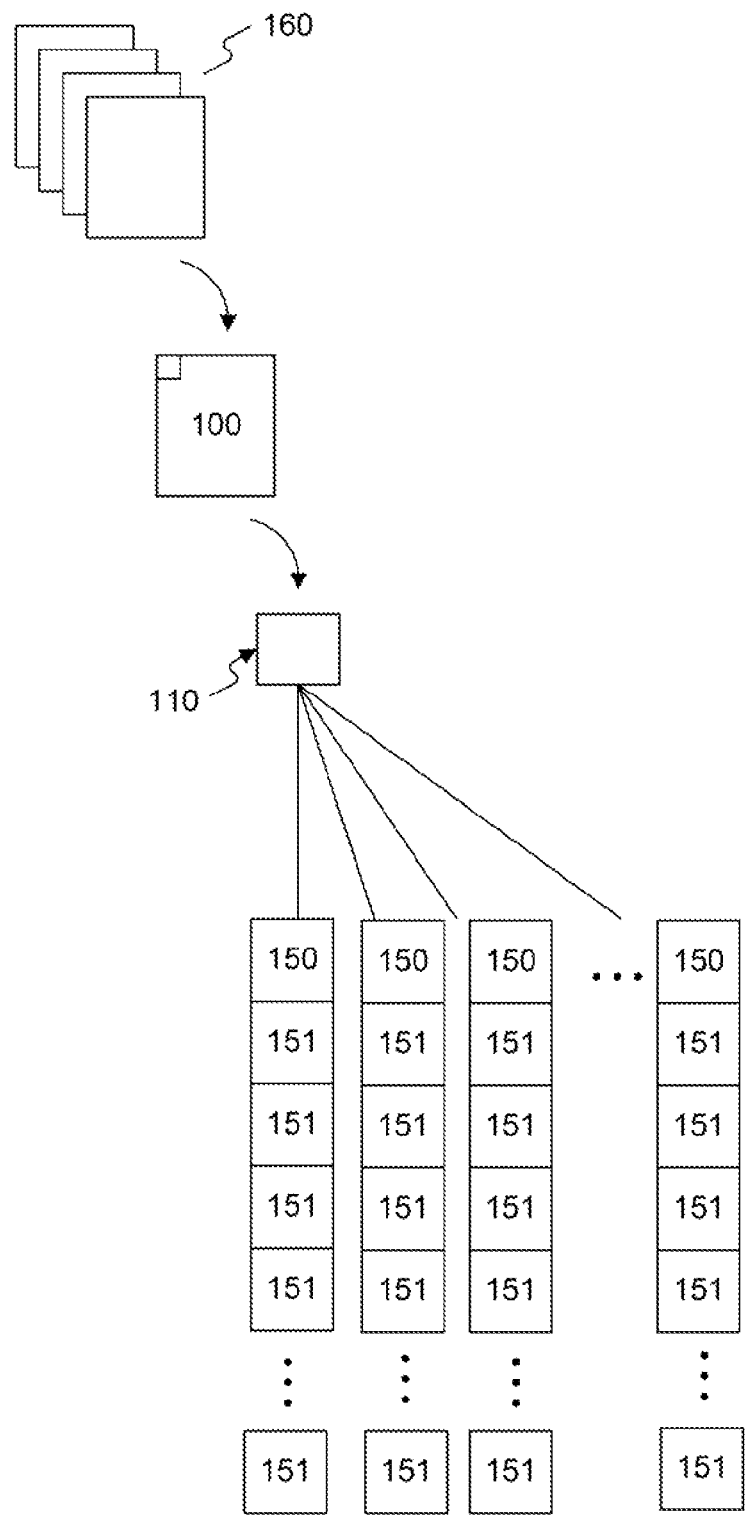
FIG. 1 depicts an exemplary multiple ground truth structure of a labeled pixel of a digital image.

FIG. 1 illustrates an exemplary multiple ground truth structure of a labeled pixel 110. As shown in FIG. 1, digital training image set 160 may comprise multiple labeled digital training images 100. One or more labeled digital training images 100 may be used for a training phase of a multi-label iterative image recognition framework consistent with the present disclosure.

All or some of the pixels of a digital training image 100 may be labeled with any number of ground truths 150. Each ground truth 150 may have any number of labels 151.

A digital training image 100 may be manually labeled by an operator with multiple ground truths 150. Individual pixels or image regions comprising multiple pixels of a training image 100 may be examined by a trained operator, and assigned one ground truth label 151 for each of the multiple ground truths 150, based on characteristics of the individual pixels or region. The number of labels 151 that a ground truth 150 has is the dimension of the ground truth 150. A ground truth 150 intended to distinguish an image region between binary conditions may be of one dimension, and only require a single label 151, such as for example, facial region or not facial region. However, a ground truth 150 intended to distinguish an image region between more than two conditions may have multiple dimensions and therefore use one or more different labels to represent the different dimensions.

Figure 2:
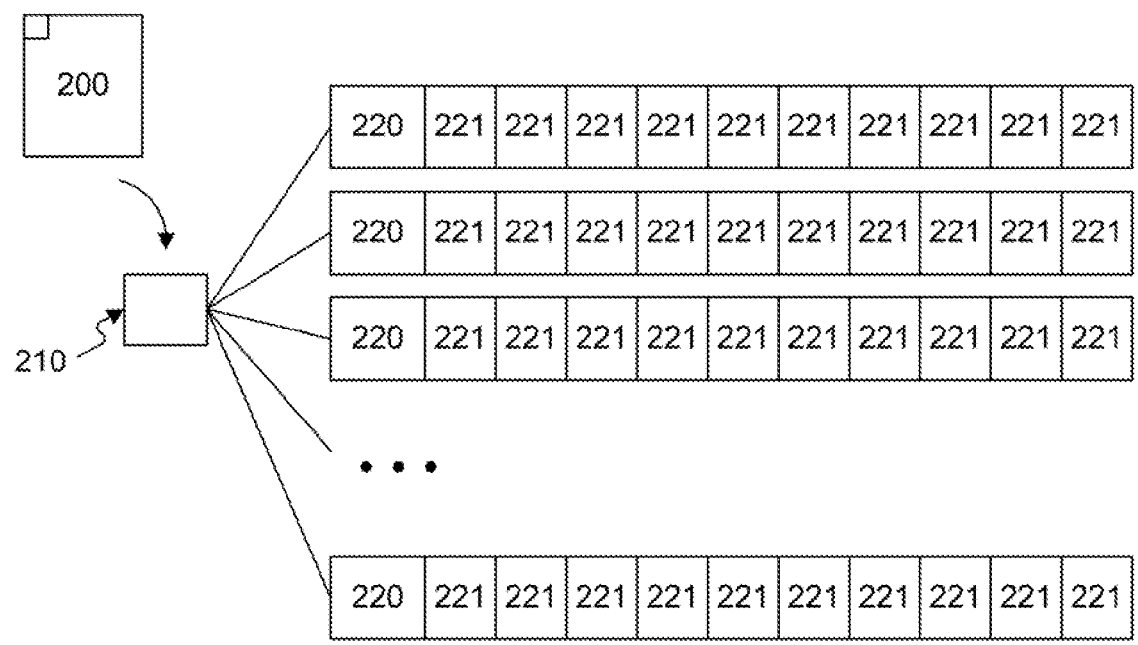
FIG. 2 depicts an exemplary pixel feature and feature descriptor structure of a characterized pixel of a digital image.

FIG. 2 illustrates an exemplary pixel feature and pixel feature descriptor structure of a characterized pixel 210 of digital image 200. As shown in FIG. 2, characterized pixel 210 may be characterized by multiple pixel features 220, each of a different feature type, such as color, intensity, or texture. Each pixel feature 220 may be characterized by multiple feature descriptors 221. The number of feature descriptors 221 characterizing each pixel feature 220 is the dimension of the pixel feature 220. The features 220 and descriptors 221 characterizing each pixel may contain data related to the pixel itself or may contain data related to the local and global neighboring pixels.

For instance, a designated pixel may be characterized by a color pixel feature 220, of a color feature type, that may comprise multiple color pixel feature descriptors 221. Each color pixel feature descriptor 221 may contain information pertaining to the color of the designated pixel or to the color of the pixels surrounding the designated pixel, either locally or globally.

Each pixel 210 of a digital image 200 may be characterized by any number of pixel features 220, each of which in turn may be characterized by any number of feature descriptors 221. Thus, each pixel of a digital image may easily be associated with thousands of feature descriptors 221 in total. The pixels 210 may be automatically characterized by computer-implemented methods. Pixels 210 may be characterized, for instance, by a multiple scale intensity histogram, histogram of the gradient, or scale-invariant feature transform. A person of skill in the art will recognize various methods and techniques with which to characterize each pixel 210.

Figure 3:
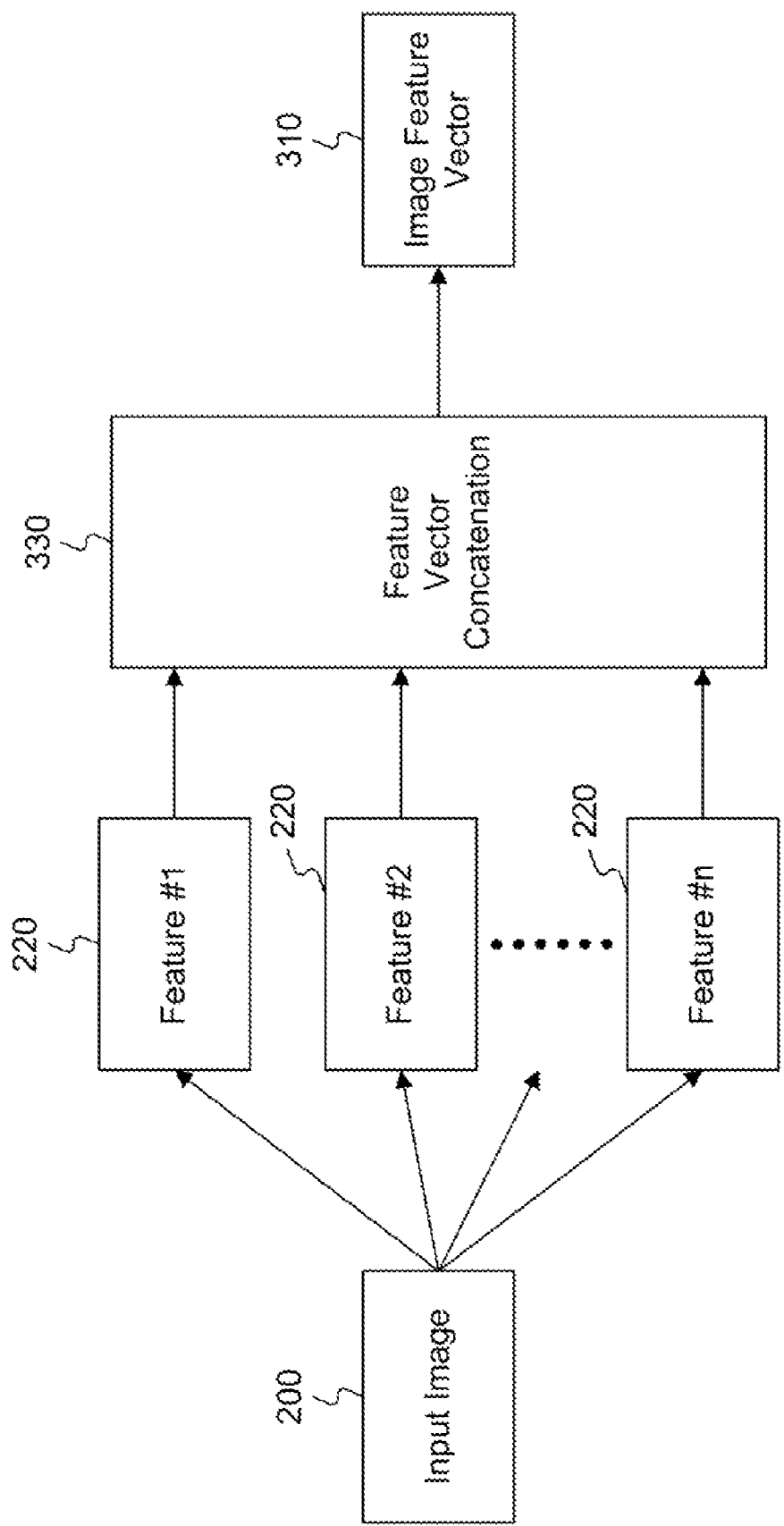
FIG. 3 illustrates an exemplary image feature vector extraction framework.

FIG. 3 illustrates an exemplary single-layer image feature vector extraction framework consistent with the present disclosure. As described above with reference to FIG. 2, all or some of the pixels of a digital image 200 may be characterized by multiple features 220 comprising multiple descriptors 221. In step 330, multiple features 220 may be concatenated into a single image feature vector 310. Thus, a single image feature vector 310 may contain the data of all or some of the features 220 and feature descriptors 221 of a characterized pixel 210. For exemplary purposes in this disclosure, a single-layer image feature vector extraction framework is presented. Methods and techniques presented in this disclosure are not limited to a single-layer image feature vector extraction framework, and may also utilize a multi-layer image feature vector extraction framework.

Figure 4:
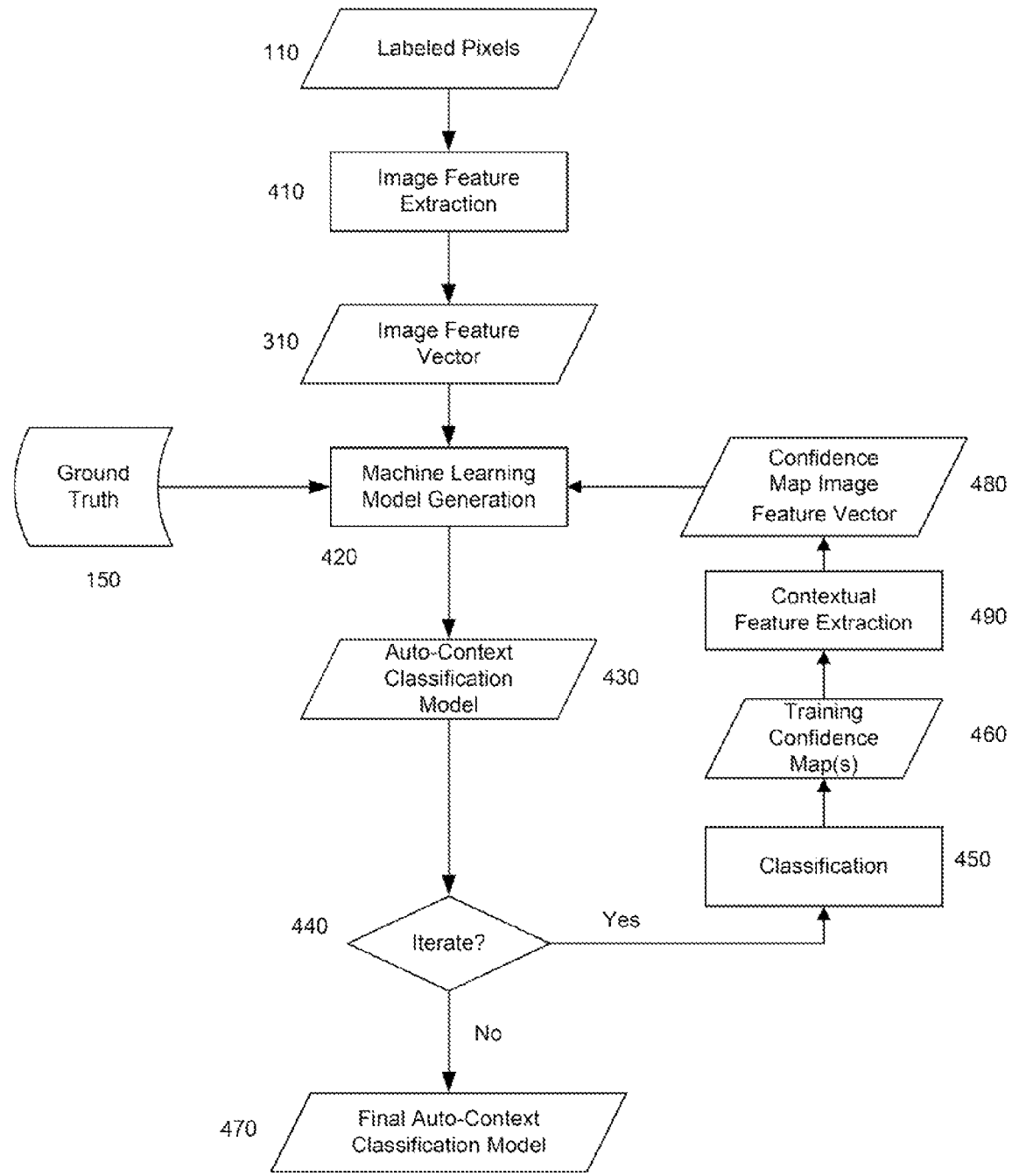
FIG. 4 is a flowchart showing the steps of an exemplary auto-context model training task.

FIG. 4 illustrates the steps of a model training task of an exemplary auto-context recognition framework consistent with the present disclosure. An auto-context recognition framework utilizes a contextual iterative classification technique to classify the pixels of a digital image. FIG. 4 illustrates the method of a training task of such a framework.

As shown in FIG. 4, a training phase of an auto-context recognition framework may operate as follows. In step 410, image feature extraction may be performed on some or all of the labeled pixels 110 of a digital training image 100. The image feature extraction step 410 processes the digital training image according to methods previously described with reference to FIG. 3. The image feature extraction step 410 may be implemented in software or hardware. Image feature extraction step 410 produces a training image feature vector 310, which may be used as an input to a machine learning model generation step 420.

Machine learning techniques may then be used to iteratively build a final auto-context classification model 470 from the training image feature vector 310 and ground truth 150 of the characterized and labeled digital training image 100.

As shown in FIG. 1, a ground truth 150 comprises multiple labels 151. In a first iteration of an auto-context classification model training method, at machine learning model generation step 420, an auto-context classification model 430 may be built by associating the feature descriptors 221 of the image feature vector 310 with the labels 151 of the ground truth 150 with which the model 430 is associated.

After a certain number of iterations have been performed (step 440), the resulting auto-context classification model 430 may then be output as final classification model 470. In certain embodiments, the training task may perform subsequent model training iterations. The number of iterations to be performed may be predetermined or may be determined on the fly. In certain embodiments, the decision whether to perform an additional iteration may be determined based on characteristics of the digital image or some other criteria. For example, an automatic determination may be made based on a training error between training confidence maps 460 and labeled pixels 110.

If another iteration is to be performed, model 430 is classified based on image feature vector 310 in step 450. Classification step 450 produces one or more training confidence maps 460 by applying model 430 to image feature vector 310. A confidence map associated with a digital image illustrates the likelihood that each pixel of the digital image belongs to a particular class of pixels, as defined by a ground truth 150. For instance, in a scene understanding classification task, a resulting confidence map may illustrate the likelihood of each pixel belonging to a sky, ground, building, or water region. A training confidence map 460, as depicted in FIG. 4, contains information representing the likelihood that each pixel 110 of the input digital training image 100 is labeled with a particular ground truth label 151, as determined by the model 430. For a ground truth 150 of one dimension, i.e. a ground truth that distinguishes between two conditions, only one training confidence map 460 is required. For a ground truth 150 of multiple dimensions, multiple training confidence maps 460 may be required, where each confidence map 460 represents the likelihood that each pixel 110 of the digital image 100 is labeled with one of the multiple ground truth labels 151. For illustrative purposes only, examples presented in this disclosure may refer to a single confidence map 460 associated with each ground truth 150. A person of skill in the art will recognize that each ground truth 150 may also be associated with multiple confidence maps 460. The number of confidence maps 460 associated with a ground truth 150 may depend, for example, on the dimension of ground truth 150.

At step 490, contextual feature extraction is performed on the training confidence maps 460. Contextual feature extraction may produce a confidence map image feature vector 480 from the training confidence map 460. Multiple confidence map image feature vectors 480 may be produced from multiple training confidence maps 460. The confidence map image feature vector 480 may comprise multiple features 220 and feature descriptors 221 containing information about the confidence map likelihood classification of each pixel and its local and global neighbors. Thus, the confidence map image feature vector 480 represents information about the likely classification of each pixel and its neighbors, as determined based on the auto-context model 430 of the current iteration.

The model 430 may then be updated at step 420. For example, the model 430 may be updated using machine learning algorithms. The feature descriptors 221 of the image feature vector 310 may be associated with both the labels 151 of the ground truth 150 with which the model 430 is associated and the feature descriptors 221 of the confidence map image feature vector 480. As in the first iteration, classification step 450 produces an updated confidence map 460 by applying the updated model 430 to the image feature vector 310

Further iterations of the auto-context framework may proceed in a similar manner. Any number of iterations may be performed to produce a final auto-context classification model 470. A person of skill in the art will recognize that using too few iterations may not capture the benefits of the iterative process, and too many iterations may tax computing resources.

The training phase of an auto-context recognition framework may utilize one or more digital training images 100 of a digital training set 160 to build a final auto-context model 470. It is not required that all of the digital training images 100 of a digital training image set 160 or all of the labeled training pixels 110 be utilized in building a final auto-context classification model 470. A model 470 may be built to associate the feature descriptors 221 of a specific type of pixel feature 220 with the labels 151 of a specific ground truth 150. In this way, for instance, an auto-context color model 470 may be constructed by associating combinations of values of the various color pixel feature descriptors 221 of a color pixel feature 220 with the ground truth labels 151 belonging to the characterized and labeled training pixels 110 to which the various color pixel feature descriptors 221 belong.

Figure 5:
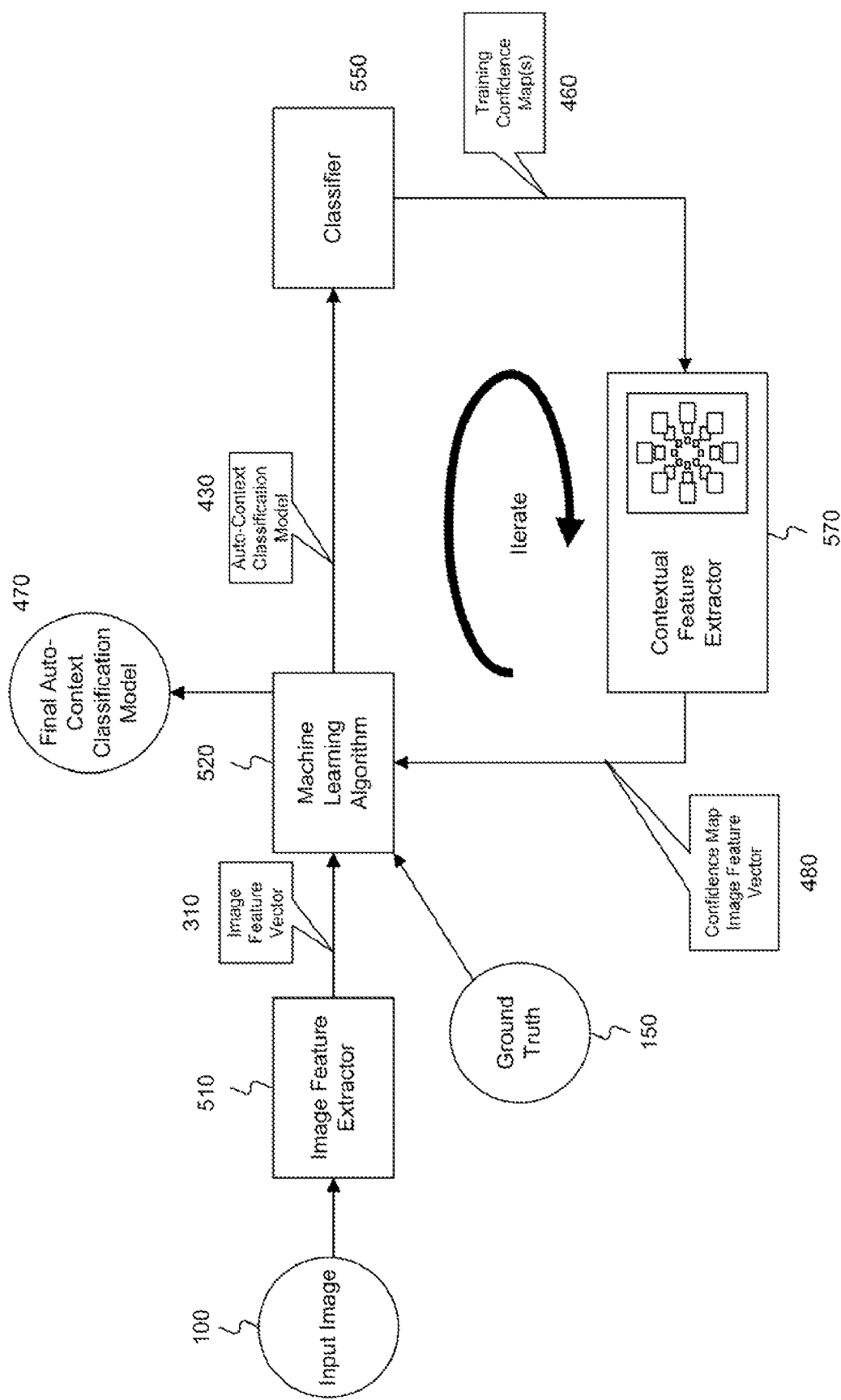
FIG. 5 illustrates a training phase of an exemplary auto-context recognition framework.

FIG. 5 illustrates the components of a training phase of an exemplary auto-context recognition framework. The components of a training phase of an auto-context recognition framework may operate as follows. Image feature extraction is performed on some or all of the labeled pixels of a digital training image 100 by an image feature extractor component 510. An image feature extractor 510 processes the digital training image according to methods previously described with reference to FIG. 3. The image feature extractor 510 may be implemented in software or hardware. Image feature extractor 510 produces a training image feature vector 310, which is used as an input to a machine learning algorithm 520.

Machine learning algorithm 520 may be used to iteratively build a final auto-context classification model 470 from the training image feature vector 310 and ground truth 150 of the characterized and labeled digital training image 100. Machine learning algorithms 520 may be implemented in software.

As shown in FIG. 1, ground truth 150 comprises multiple labels 151. In a first iteration of an auto-context classification model training task, machine learning algorithm 520 generates an auto-context classification model 430 by associating the feature descriptors 221 of the image feature vector 310 with the labels 151 of the ground truth 150 with which model 430 is associated.

Next, classifier 550 applies the model 430 to the image feature vector 310 to produce a training confidence map or maps 460. For illustrative purposes only, further description of this exemplary embodiment may refer to a single confidence map 460.

A contextual feature extractor 570 may then perform a feature extraction on the training confidence map 460, producing a confidence map image feature vector 480.

The model 430 may then be updated by machine learning algorithm 520. For example, feature descriptors 221 of the image feature vector 310 may be associated with both the labels 151 of the ground truth 150 with which the model 430 is associated and the feature descriptors 221 of the confidence map image feature vector 480. As in the first iteration, the updated model 430 is then applied to the image feature vector 310 to update the training confidence map 460.

Further iterations of the auto-context framework may proceed in a similar. Any number of iterations may be performed to produce a final auto-context classification model 470. A person of skill in the art will recognize that using too few iterations may not capture the benefits of the iterative process, and too many iterations may tax computing resources.

Figure 6:
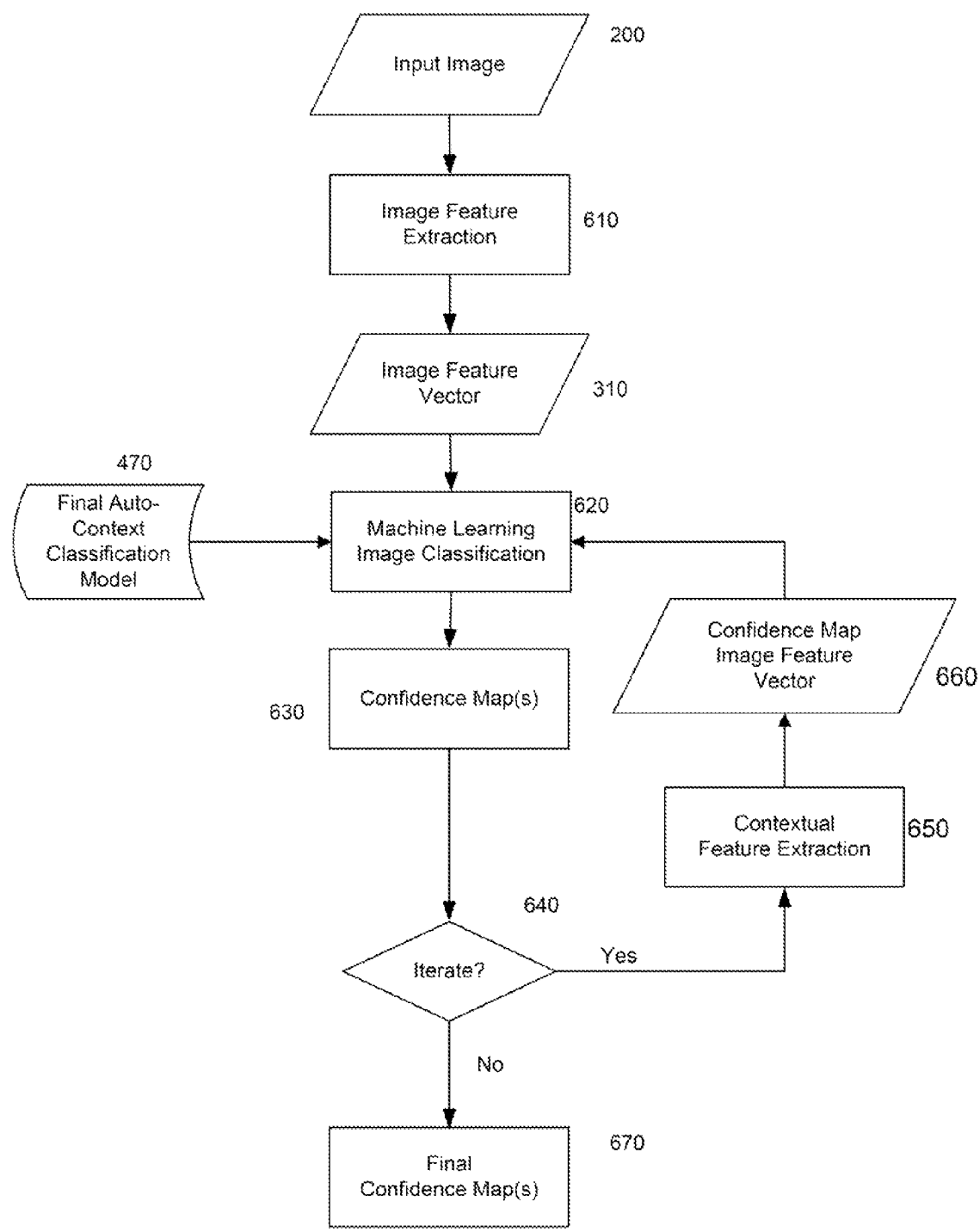
FIG. 6 is a flowchart showing the steps of an exemplary auto-context model image classification task.

FIG. 6 is a flow chart showing the steps of a classification task of an exemplary auto-context recognition framework. An auto-context recognition framework classification phase utilizes a contextual iterative technique to classify the pixels of a digital image 200 according to a desired ground truth 150 associated with the final auto-context model 470.

With reference to FIG. 6, an exemplary auto-context recognition framework classification phase may proceed as follows. Some or all of the pixels of an input digital image 200 may be subjected to image feature vector extraction (step 610), which may be performed, for example, according to methods previously described with reference to FIG. 3. The image feature extraction step 610 produces an image feature vector 310, which is used as an input to a machine learning classification step 620.

Machine learning techniques may then be used to iteratively build a final auto-context confidence map 670 from the image feature vector 310 and a final auto-context classification model 470.

In a first iteration, one or more confidence maps 630 may be produced using an auto-context model 470 and an image feature vector 310 (step 620). Confidence maps 630 may be generated by determining the likelihood that each pixel should have a particular ground truth label 151 based on the auto-context model 470. The number of confidence maps 630 generated may depend on the dimension of the ground truth 150 associated with the final auto-context classification model 470. For illustrative purposes only, further description of this exemplary embodiment may refer to a single confidence map 630.

In step 640, it is determined whether additional iterations should be performed. The number of iterations may be predetermined or may be dynamically generated based on characteristics of the digital image 200 or other criteria. For example, in embodiments where the number of iterations is predetermined, this step may involve keeping a counter of number of iterations performed, and comparing the counter to the number of iterations to be performed. If the desired number has not been reached, a determination will be made that another iteration should be performed.

In some embodiments, the number of iterations to perform may not be predetermined, and the determination as to whether to continue may involve, for example, comparing confidence map 630 of a current iteration to a confidence map 630 from a previous iteration.

If it is determined that no more iterations are to be performed, the current auto-context confidence map 630 may then be output as final auto-context confidence map 670.

If more iterations are to be performed, contextual feature extraction may be performed on the current confidence map 630 (step 650). Contextual feature extraction may produce a confidence map image feature vector 660 from the confidence map 630. The confidence map image feature vector 660 may comprise multiple features 220 and feature descriptors 221 containing information about the classification likelihood of each pixel of digital image 200 and its local and global neighbors. Thus, the confidence map image feature vector 660 represents information about the likely classification of each pixel and its neighbors, as determined by the final auto-context model 470.

The confidence map 630 may then be updated at machine learning classification step 620. Machine learning algorithms may be used to update the confidence map 630, using information from the auto-context model 470, the current image feature vector 310, and confidence map image feature vector 660.

Further iterations of the auto-context framework may proceed in a similar manner. Any number of iterations may be performed to produce a final confidence map 670. A person of skill in the art will recognize that using too few iterations may not capture the benefits of the iterative process, and too many iterations may tax computing resources.

Figure 7:
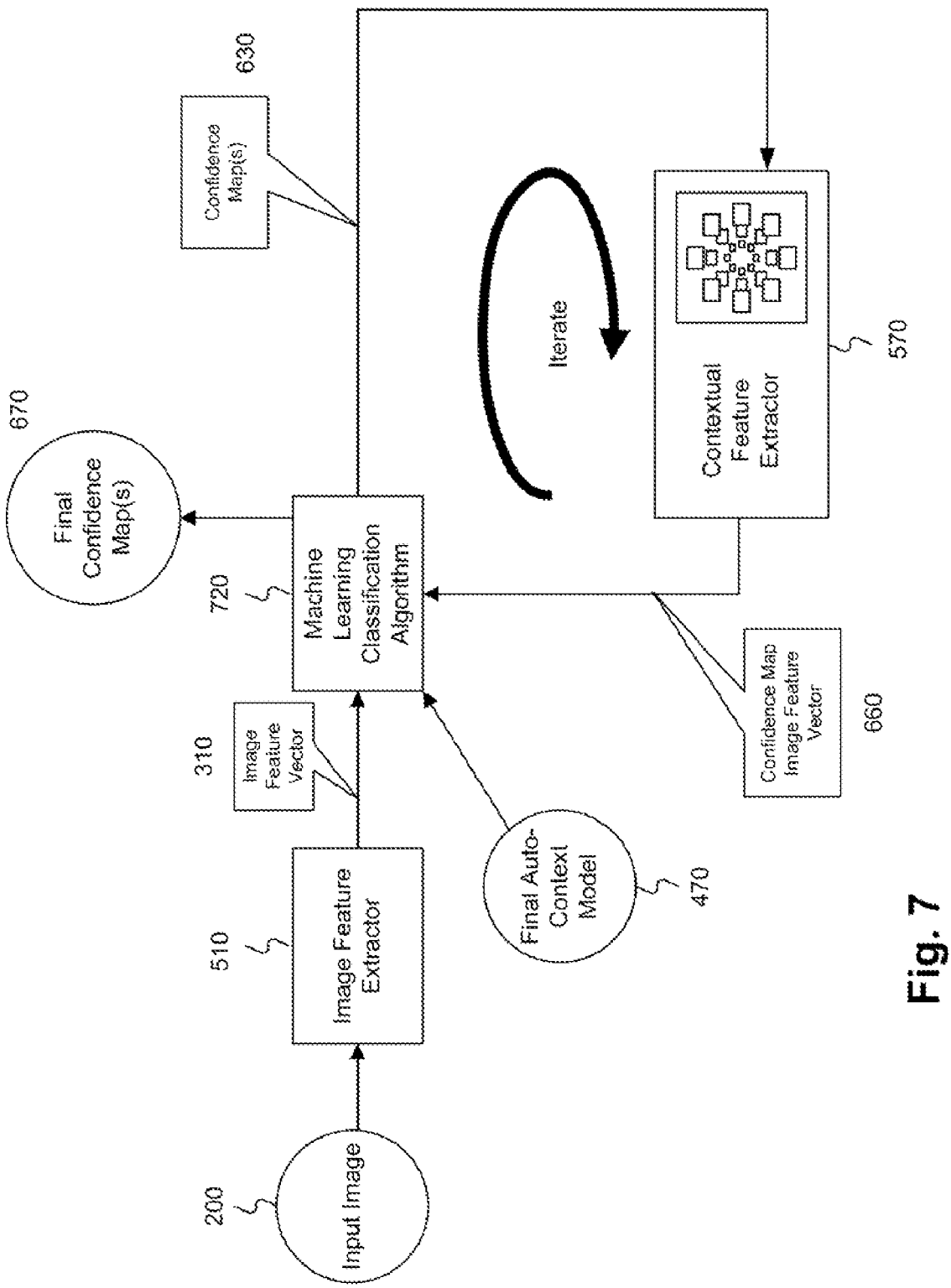
FIG. 7 illustrates components of a classification phase of an exemplary auto-context recognition framework.

FIG. 7 illustrates the components of a classification phase of an exemplary auto-context recognition framework.

An auto-context recognition framework classification phase may proceed as follows. Some or all of the pixels of an input digital image 200 may be processed by an image feature extractor 510, according to methods previously described with reference to FIG. 3. The image feature extractor 510 may be implemented in software or hardware. The image feature extractor 510 produces a classification image feature vector 310, which is used as an input to a machine learning classification algorithm 720.

Machine learning classification algorithm 720 may be used to iteratively build a final auto-context confidence map 670 from the image feature vector 310 and a final auto-context model 470.

In a first iteration, a machine learning classification algorithm 720 may use an auto-context model 470 and image feature vector 310 to generate one or more confidence maps 630. For illustrative purposes only, further description of this exemplary embodiment may refer to a single confidence map 630.

Next, contextual feature extractor 570 may perform a feature extraction on the confidence map 630. The contextual feature extraction step 650 may produce a confidence map image feature vector 660 from the confidence map 630.

The confidence map 630 may then be updated by machine learning classification algorithm 720. Machine learning classification algorithm 720 may use the auto-context model 470, the image feature vector 310, and the current confidence map image feature vector 660 to update the confidence map 630. Multiple iterations may be performed as described above. The number of iterations performed may be predetermined or determined dynamically, as is also described above.

Further iterations of the auto-context framework may proceed in a similar manner. Any number of iterations may be performed to produce a final confidence map 670. A person of skill in the art will recognize that using too few iterations may not capture the benefits of the iterative process, and too many iterations may tax computing resources.

Figure 8:
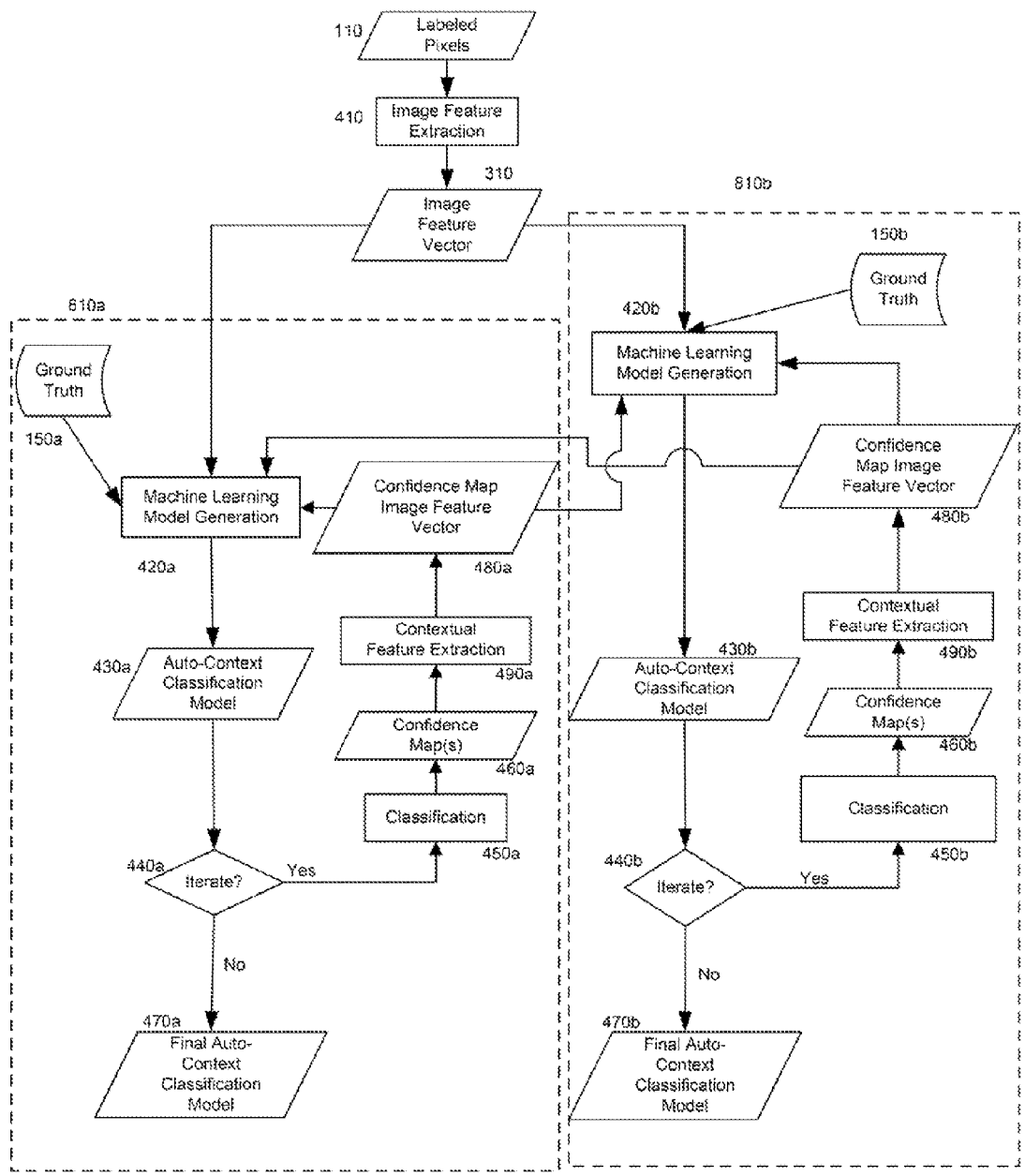
FIG. 8 is a flowchart showing the steps of an exemplary multiple ground truth image classification model training task.

FIG. 8 illustrates the steps of a training task of an exemplary multiple label image recognition framework. An exemplary multiple label image recognition framework uses multiple coordinated analysis paths 810 to complete a model training task. Each coordinated analysis path utilizes one or more ground truths 150 in an auto-context recognition framework, as previously described with reference to FIGS. 4 and 5. Additionally, after each iteration, each analysis path 810 communicates interim results to some or all of the other analysis paths 810. The exemplary multiple label image recognition method illustrated in FIG. 8 shows two analysis paths 810*a* and 810*b*. However, it is understood that a multiple label image recognition framework consistent with the disclosure may comprise any number of analysis paths 810.

The method of a training task of an exemplary multiple label image recognition framework may proceed as follows. In step 410, image feature extraction is performed on some or all of the labeled pixels 110 of a digital training image 100. The image feature extraction step 310 may be performed according to methods previously described with reference to FIG. 3. The image feature extraction step 410 produces a training image feature vector 310, which is used as an input to the machine learning model generation steps 420*a* and 420*b* of the analysis paths 810*a*, 810*b*.

A first iteration of analysis path 810*a* of a multi-label model training task may proceed through machine learning model generation step 420*a* and iteration decision step 440*a* as previously described with reference to FIG. 4.

Subsequent iterations of analysis path 810*a* of a multi-label model training task may then proceed through classification step 450*a* and contextual feature extraction step 490*a* as previously described with reference to FIG. 4.

As a result of contextual feature extraction (step 490*a*), confidence map image feature vector 480*a* is produced. Confidence map image feature vector 480*a* is provided to machine learning model generation learning step 420*b* of analysis paths 810*b* and confidence map image feature vector 480*b* is provided to machine learning model generation step 420*a*

In step 420*a*, machine learning techniques may be used to update model 430*a*. Model 430*a* may be updated by associating the feature descriptors 221 of the image feature vector 310 with the labels 151 of the ground truth 150*a* with which model 430*a* is associated, the feature descriptors 221 of the confidence map image feature vector 480*a* produced within analysis path 810*a*, and the feature descriptors 221 of the confidence map image feature vector 480*b* produced by analysis path 810*b*.

In an embodiment having more than two analysis paths 810, the machine learning model generation step 420 of a particular analysis path 810 may be provided confidence map image feature vectors 480 from all or some of the other analysis paths 810. It is not required that the machine learning model generation step 420 of an analysis path 810 receive or utilize a confidence map image feature vector 480 from every other analysis path 810. The classification of pixels by one ground truth 150 is not always beneficial to the classification of pixels by a second ground truth 150. The decision to communicate or use the confidence map image feature vectors 480 from another analysis path may be predetermined or determined dynamically. For instance, in a facial recognition task, it may have been previously determined that pixels classified as an image background provide no additional benefit to the classification of an eye region than that provided by pixels classified as a facial region. In this example, an operator may preemptively determine not to use the confidence map image feature vector 480 from an analysis path 810 related to an image background ground truth label 151 for classifying the pixels according to an eye region ground truth label 151. Such a determination may also be made dynamically, for instance during the machine learning model generation step 420, it may be dynamically determined that, for building an auto-context classification model 430 for the classification of an eye region, a confidence map image feature vector 480 related to an image background ground truth label 151 is redundant compared to a confidence map image feature vector 480 related to a facial region Further iterations of the multi-label image recognition training phase may proceed in similar manner. Any number of iterations may be performed to produce final auto-context classification models 470a and 470b, each associated with different ground truths 150a and 150b. As mentioned above, a person of skill in the art will recognize that using too few iterations may not capture the benefits of the iterative process, and too many iterations may tax computing resources.

Figure 9:
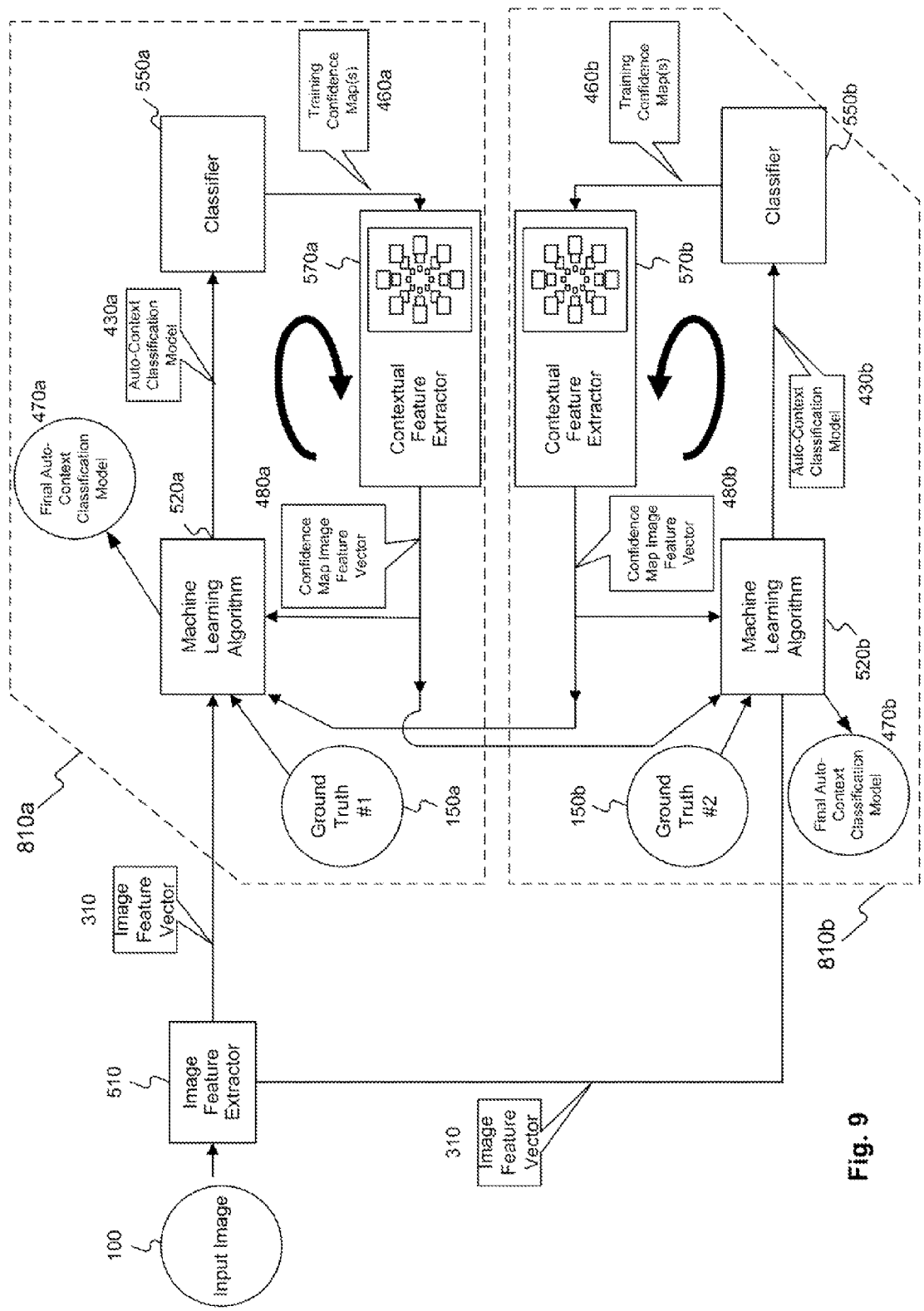
FIG. 9 illustrates components of a training phase of an exemplary multiple ground truth image recognition framework.

FIG. 9 illustrates the components of a training phase of an exemplary multiple label image recognition framework that uses multiple coordinated analysis paths 810 to complete a model training task. Each coordinated analysis path utilizes one or more ground truths 150 in an auto-context recognition framework, as previously described with reference to FIG. 5. Additionally, after each iteration, an analysis path 810 communicates interim results to some or all of the other analysis paths 810.

An exemplary multiple label image recognition framework may have the following components. Image feature extractor 510 processes the digital training image according to methods previously described with reference to FIG. 3. Image feature extractor 510 produces a training image feature vector 310, which is used as an input to the machine learning algorithms 520a and 520b of analysis paths 810a and 810b.

A first iteration of analysis path 810a of a multi-label model training task may be performed by machine learning algorithm 520a as previously described with reference to FIG. 5.

Subsequent iterations of analysis path 810a of a multi-label model training task may then be performed by classifier 550a, contextual feature extractor 570a, and machine learning algorithm 520a, as previously described with reference to FIG. 5.

Contextual feature extractor 570a produces confidence map image feature vector 480a. Confidence map image feature vector 480a may then be provided to model generation learning algorithm 520b of analysis path 810b, and confidence map image feature vector 480b may be provided to machine learning algorithm 520a.

Classification model 430a analysis path 810a may then be updated by the model training machine learning algorithm 520a. Model 430a may be updated by associating the feature descriptors 221 of the image feature vector 310 with the labels 151 of the ground truth 150a with which the model 430a is associated, the feature descriptors 221 of the confidence map image feature vector 480a produced within the analysis path 810a, and the feature descriptors 221 of the confidence map image feature vector 480b produced by analysis path 810b.

In an embodiment having more than two analysis paths 810, the machine learning model algorithm 520 of a particular analysis path 810 may be provided confidence map image feature vectors 480 from all or some of the other analysis paths 810. It is not required that the model generation machine learning algorithm 520 of each analysis path 810 receive or utilize a confidence map image feature vector 660 from every other analysis path 810.

Further iterations of the multi-label image recognition training phase may proceed in a manner similar to that of the second iteration. Any number of iterations may be performed to produce final auto-context classification models 470a and 470b, associated with different ground truths 150a and 150b. A person of skill in the art will recognize that using too few iterations may not capture the benefits of the iterative process, and too many iterations may tax computing resources.

Figure 10:
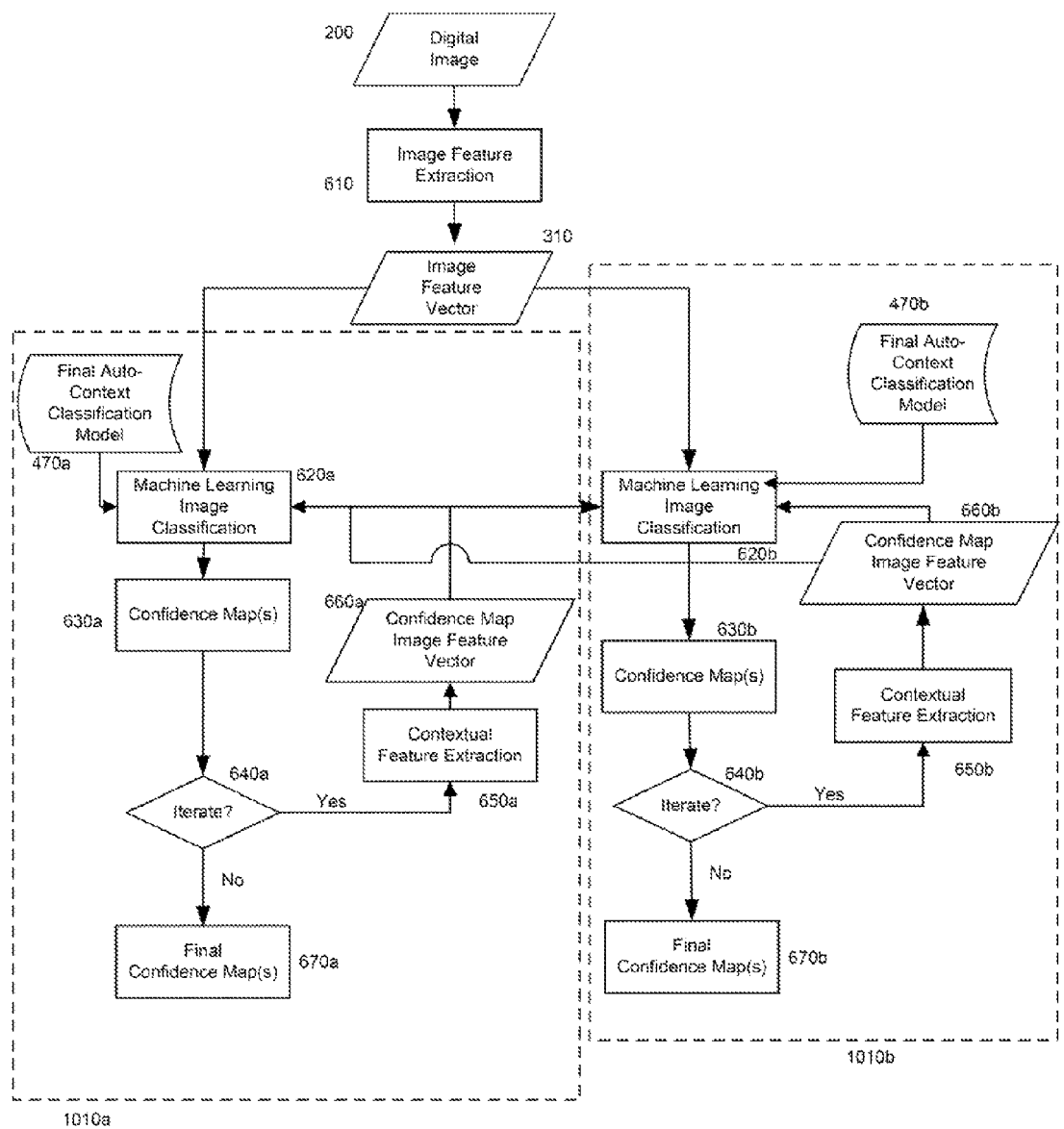
FIG. 10 is a flowchart showing the steps of an exemplary multiple ground truth image classification task.

FIG. 10 illustrates the steps of a classification method of an exemplary multiple label image recognition framework. An exemplary multiple label image recognition framework uses multiple coordinated analysis paths 1010 to complete an image classification task. Each coordinated analysis path 1010 utilizes one or more ground truths 150 in an auto-context recognition framework, as previously described with reference to FIG. 6. Additionally, after each iteration, an analysis path 1010 communicates interim results to some or all of the other analysis paths 1010. The exemplary multiple label image recognition method illustrated in FIG. 10 shows two analysis paths 1010a and 1010b. However, it is understood that a multiple label image recognition framework consistent with the disclosure may comprise any number of analysis paths 1010.

The method of a training task of an exemplary multiple label image recognition framework may proceed as follows. In step 610, image feature extraction is performed on some or all of the pixels of a digital image 200. An image feature extraction step 610 processes the digital training image according to methods previously described with reference to FIG. 3. The image feature extraction step 610 produces an image feature vector 310, which is used as an input to the machine learning classifications steps 620a and 620b of analysis paths 1010a and 1010b.

A first iteration of analysis path 1010a of a multi-label image classification task may proceed through machine learning classification step 620a and iteration decision step 640a as previously described with reference to FIG. 6.

Subsequent iterations of analysis path 1010a of a multi-label image classification task may then proceed through contextual feature extraction step 650a as previously described with reference to FIG. 6.

At step 650a, confidence map image feature vector 660a is produced. Confidence map image feature vector 660a may then be communicated to the machine learning classification step 620b of analysis path 1010b, and confidence map image feature vector 660b may be provided to machine learning image classification step 620a.

Confidence map 630a may then be updated at machine learning classification step 620a. Confidence map 630a of analysis path 1010a may be updated by using the image feature vector 310, the auto-context model 470a associated with analysis path 1010a, confidence map image feature vector 660a, and confidence map image feature vector 660b produced by analysis path 1010b.

In an embodiment having more than two analysis paths 1010, the machine learning image classification step 620 of a particular analysis path 1010 may be provided confidence map image feature vectors 660 from all or some of the other analysis paths 1010. It is not required that the machine learning image classification step 620 of an analysis path 1010 receive or utilize a confidence map image feature vector 660 from every other analysis path 1010.

Further iterations of the multi-label image recognition classification phase may proceed in a manner similar to that of the second iteration. Any number of iterations may be performed to produce final confidence maps 670a and 670b, each associated with different ground truths 150a and 150b. A person of skill in the art will recognize that using too few iterations may not capture the benefits of the iterative process, and too many iterations may tax computing resources.

Figure 11:
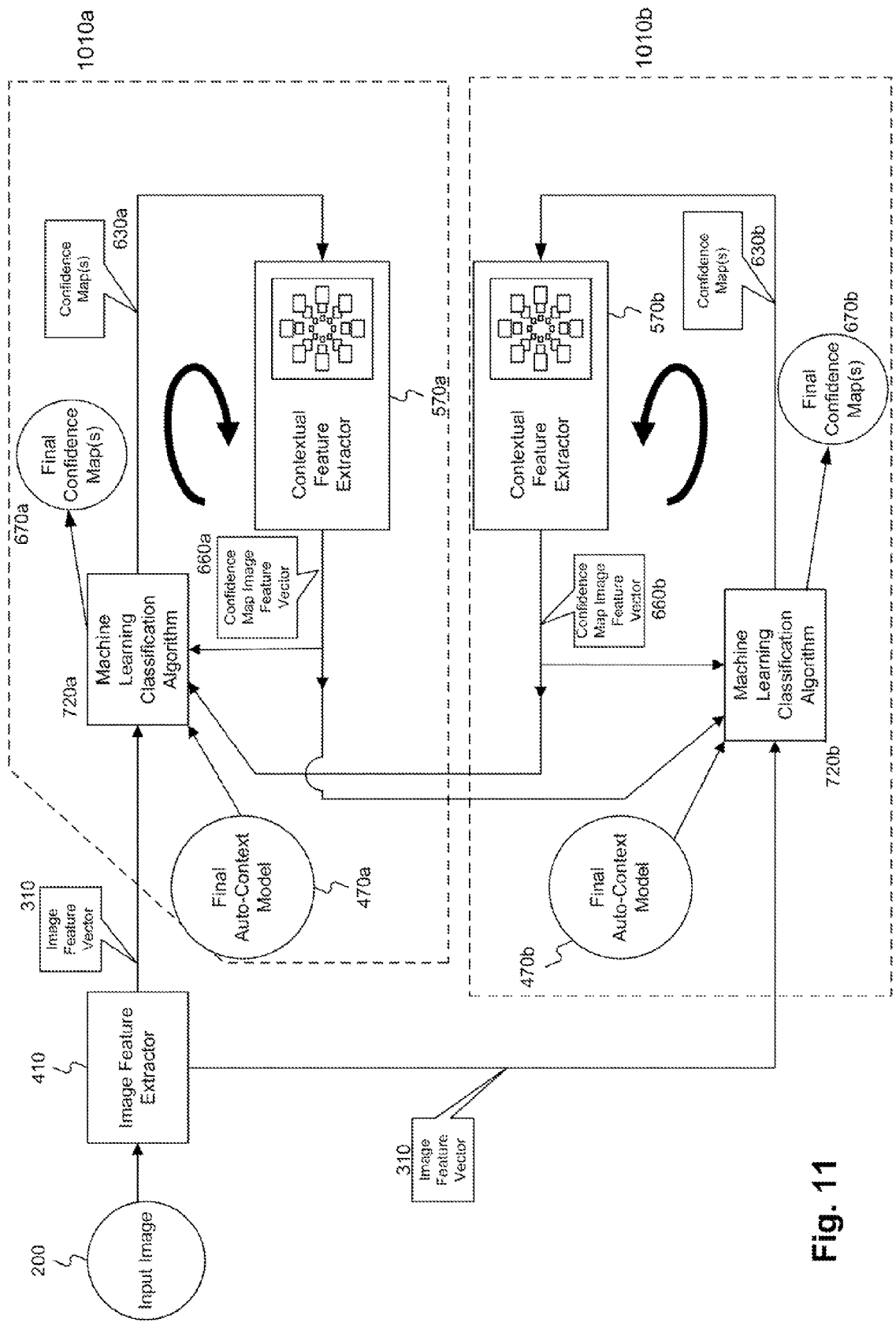
FIG. 11 illustrates components of a classification phase of an exemplary multiple ground truth image recognition framework.

FIG. 11 illustrates the components of a classification phase of an exemplary multiple label image recognition framework. An exemplary multiple label image recognition framework uses multiple coordinated analysis paths 1010 to complete an image classification task. Each coordinated analysis path 1010 utilizes one or more ground truths 150 in an auto-context recognition framework, as previously described with reference to FIG. 7. Additionally, after each iteration, each analysis path 1010 communicates interim results to some or all of the other analysis paths 1010. The exemplary multiple label image recognition method illustrated in FIG. 11 shows two analysis paths 1010a and 1010b. However, it is understood that a multiple label image recognition framework consistent with the disclosure may comprise any number of analysis paths 1010.

The components of a training task of an exemplary multiple label image recognition framework may perform as follows.

Image feature extraction is performed on some or all of the pixels of a digital image 200 by image feature extractor 510. Image feature extractor 510 processes the digital training image according to methods previously described with reference to FIG. 3. Image feature extractor 510 produces an image feature vector 310, which is used as an input to machine learning classification algorithms 720a and 720 of analysis paths 1010a and 1010b.

A first iteration of analysis path 1010a of a multi-label image classification task may be perform by machine learning classification algorithm 720a as previously described with reference to FIG. 7.

Subsequent iterations of analysis path 1010a of a multi-label image classification task may be performed by contextual feature extractor 570a and machine learning algorithm 720a as previously described with reference to FIGS. 6 and 7.

Contextual feature extractor 570a produces confidence map image feature vector 660a by performing a feature extraction on confidence map 630a. Confidence map image feature vector 660a may then be provided to machine learning classification algorithm 720b, and confidence map image feature vector 660b may be provided to machine learning classification algorithm 720a. of all or some of the other analysis paths 1010.

Confidence map 630a may then be updated by machine learning classification algorithm 720a. Confidence map 630a of analysis path 1010a may be updated by machine learning classification algorithm 720a using the image feature vector 310, the auto-context model 470a associated with analysis path 1010a, confidence map image feature vector 660a, and confidence map image feature vector 660b produced by analysis path 1010b.

In an embodiment having more than two analysis paths 1010, the machine learning model classification algorithm 720 of a particular analysis path 1010 may be provided confidence map image feature vectors 660 from all or some of the other analysis paths 1010. It is not required that the machine learning classification algorithm 720 of each analysis path 1010 receive or utilize a confidence map image feature vector 660 from every other analysis path 1010.

Further iterations of the multi-label image recognition classification phase may proceed in a manner similar to that of the second iteration. Any number of iterations may be performed to produce final confidence maps 670a and 670b, each associated with different ground truths 150a and 150b. A person of skill in the art will recognize that using too few iterations may not capture the benefits of the iterative process, and too many iterations may tax computing resources.

A multi-label image recognition classification phase may output multiple final confidence maps 670, each confidence map associated with a particular ground truth or truths 150. The final confidence maps 670 so produced may provide useful information for a variety of subsequent computer implemented image processing tasks, or may be useful on their own to classify various regions of an input image for further analysis by a human operator. Used as input to further image processing tasks, the multiple confidence maps 670 may serve to differentiate all or a portion of a digital image into regions, according to characteristics represented by the ground truths 150 for further processing. For instance, in a facial recognition task applied to an image of a crowd, all of the eye regions in an input image may be differentiated for later comparison to a databank of known eye region images. Final confidence maps 670 may also be used to automatically differentiate the various regions of a digital image for subsequent analysis by a human operator. For instance, in a facial recognition task applied to an image of a crowd, the confidence maps 670 may be utilized to isolate all of the faces that have a similar characteristic, such as red hair, for further analysis by a human operator.

Figure 12:
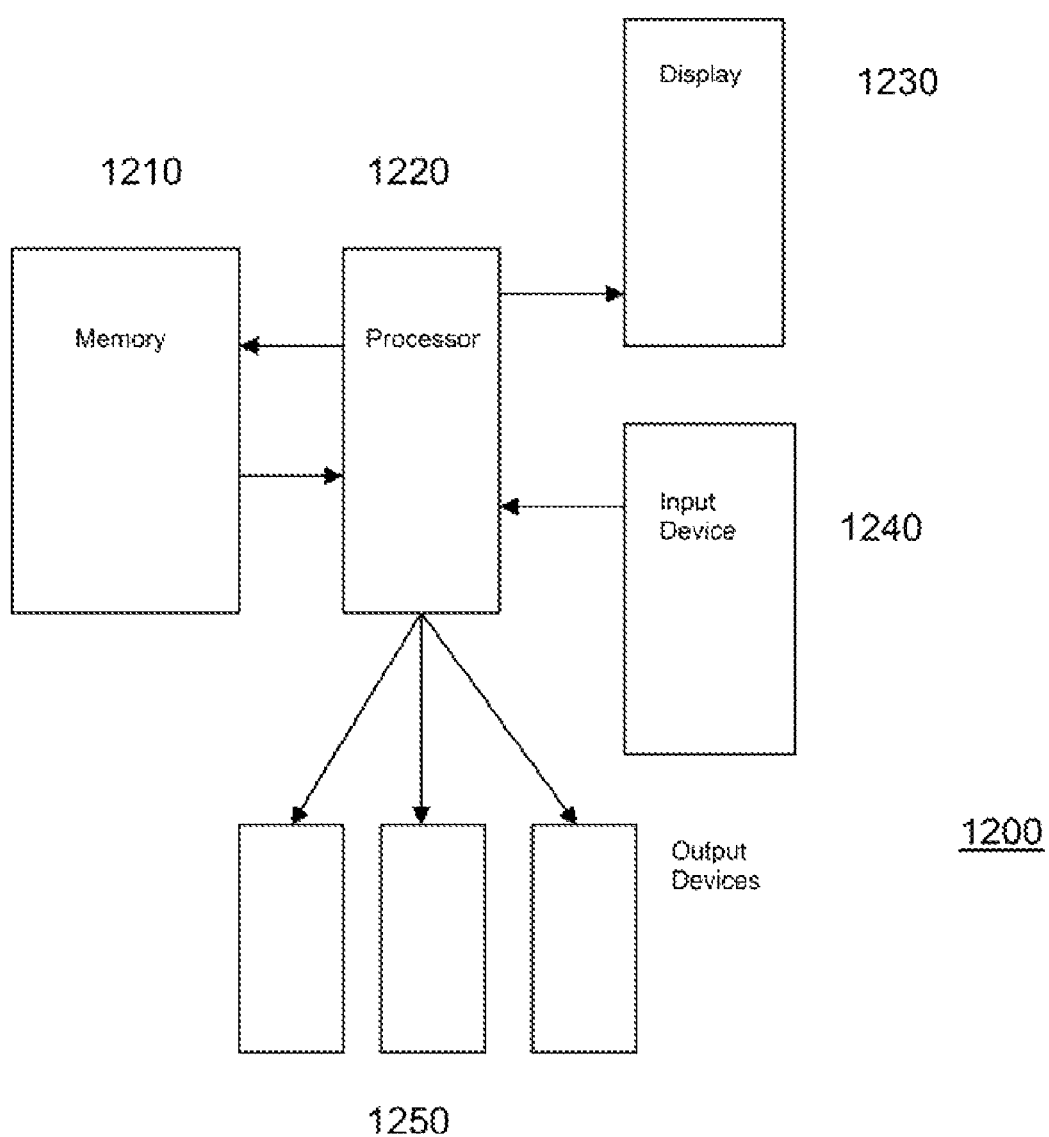
FIG. 12 shows an exemplary computer system for implementing the disclosed methods and techniques.

FIG. 12 illustrates a system 1200 consistent with the present disclosure. The component and methods described herein may be implemented or carried out by a system comprising a memory 1210, a processor 1220, and a display 1230. Images and data sets described herein may be stored in memory 1210. Memory 1210 may include any storage device capable of storing data processed by processor 1220. Memory 1210 may be, for example, a floppy disk, or other magnetic medium, or a blank RAM. Processing steps may be carried out by processor 1220 implementing processing components. Processor 1220 may be any commonly available digital processor or may be a special purpose digital processor. Software stored on the computer memory may contain instructions to perform the steps described herein or implement the system components described herein. Results of the disclosed methods and techniques may be displayed on a computer display 1230. A user input device, such as a keyboard 1240, may be provided to permit user interaction. Additional output devices 1250, such as a printer, may also be provided.

Multi-label image classification techniques disclosed here provide means of incorporating additional human labels over conventional single label recognition techniques. Incorporation of additional human labels provides a classification technique that utilizes additional human intelligence. Images may therefore be classified more accurately over a conventional single-layer technique. Multi-label image classification techniques disclosed herein may be used as part of a comprehensive digital image analysis system, for instance, to create top-down confidence maps to serve as input for further image analysis techniques. Techniques disclosed herein may also be used with no additional methods for performing a variety of image classification tasks.

From the foregoing description, it will be appreciated that the present invention provides a method and apparatus for the efficient and accurate classification of a digital image. The proposed multi-label image recognition framework can be generalized to all types of digital images.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Embodiments of the methods disclosed herein may be implemented as a computer program product, i.e., a computer program comprising instructions tangibly embodied on an information carrier, e.g., in a machine-readable storage device, or a tangible computer-readable medium, which when executed for execution control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

From the foregoing description, it will be appreciated that the methods and apparatus described herein to classify the digital images of the examples may be adapted to classify any digital images having characteristics suitable to these techniques, such as high image resolution, non-uniformly distributed texture pattern, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented feature extraction method for classifying pixels of a digitized image, the method to be performed by a system comprising at least one processor and at least one memory, the method comprising:
    generating a plurality of characterized pixels from a digitized image;
    generating a plurality of classification models by associating features of the plurality of characterized pixels with labels of a plurality of ground truths, wherein each of the plurality of ground truths is associated with a respective one of a plurality of image classifications;
    determining by the system a plurality of confidence maps based on the plurality of classification models, wherein the confidence maps contain information representing a likelihood of each pixel in the digitized image belonging to one of the plurality of image classifications; and
    iteratively improving the plurality of classification models by
        (a) extracting a plurality of contextual image feature vectors from the most-recently generated plurality of confidence maps,
        (b) updating the plurality of classification models based on the most-recently extracted plurality of contextual image feature vectors, and
        performing steps a and b for a threshold number of iterations; and
    outputting by the system a plurality of final classification models that classify part or all of the pixels of the digitized image.

2. The method of claim 1, wherein extracting a plurality of contextual image feature vectors further comprises:
    characterizing by the system a plurality of the pixels of a respective one of the plurality of the confidence maps with features based on the likelihood of neighboring pixels belonging to a respective one of the plurality of classifications associated with the respective one of the plurality of confidence maps.

3. The method of claim 1, wherein generating a plurality of characterized pixels further comprises:
    generating by the system a plurality of features corresponding to each pixel of the plurality of pixels, wherein each feature of the plurality of features comprises a plurality of feature descriptor values and corresponds to a feature type from among a plurality of feature types; and
    the feature descriptor values of each feature of the plurality of features of each pixel of the plurality of pixels are determined based on data from the digital image.

4. A computer-implemented feature extraction method for classifying pixels of a digitized image, the method to be performed by a system comprising at least one processor and at least one memory, the method comprising:
    generating a plurality of characterized pixels from a digitized image;
    determining by the system a plurality of confidence maps by applying a plurality of classification models to features of the plurality of characterized pixels, wherein a confidence map contains information representing likelihoods of the characterized pixels belonging to a respective one of a plurality of classifications and a classification model associates features of the plurality of characterized pixels with a respective one of the plurality of classification; and
    iteratively improving the plurality of confidence maps by
        (a) extracting a plurality of contextual image feature vectors from the most-recently generated plurality of confidence maps,
        (b) updating the plurality of confidence maps based on the most-recently extracted plurality of contextual image feature vectors, and
        performing steps a and b for a threshold number of iterations; and
    outputting by the system a plurality of final confidence maps that classify part or all of the pixels of the digitized image.

5. The method of claim 4, wherein extracting a plurality of contextual image feature vectors further comprises:
    characterizing by the system a plurality of the pixels of a respective one of the plurality of the confidence maps with features based on the likelihood of neighboring pixels belonging to a respective one of the plurality of classifications associated with the respective one of the plurality of confidence maps.

6. The method of claim 4, wherein generating a plurality of characterized pixels further comprises:

generating by the system a plurality of features corresponding to each pixel of the plurality of pixels, wherein each feature of the plurality of features comprises a plurality of feature descriptor values and corresponds to a feature type from among a plurality of feature types; and the feature descriptor values of each feature of the plurality of features of each pixel of the plurality of pixels are determined based on data from the digital image.

7. A system for image recognition analysis of a digital image comprising:

a memory having program instructions and data storage space;

a processor configured to use the program instructions to implement:

an image feature extractor module for extracting an image feature vector, wherein the image feature vector contains information related to pixels of the digital image;

a machine learning model generation module for generating a classification model from the image feature vector, a plurality of ground truth labels and a confidence map image feature vector, wherein the classification model associates the information of the image feature vector and the confidence map image feature vector with the ground truth labels and each of the plurality of ground truths is associated with a respective one of a plurality of image classifications;

a confidence map generating module for generating a confidence map based on the classification model and the image feature vector, wherein the confidence map contains information representing a likelihood of each pixel belonging to a respective one of the plurality of classifications;

a contextual feature extractor module for extracting the confidence map image feature vector from a most-recently generated confidence map, wherein the confidence map image feature vector contains information related to pixels of the confidence map, wherein the classification model is updated to iteratively improve the classification models based on a most-recently extracted confidence map image feature vector and further wherein both the confidence map image feature vector is extracted and the classification model is updated, for a threshold number of iterations; and a machine learning classification module for classifying pixels of a second digital image based on the classification model.

8. The system of claim 7, wherein the contextual feature extractor module extracts the confidence map image feature vector by characterizing a plurality of the pixels of the confidence map with features based on a likelihood of neighboring pixels belonging to a specific one of the plurality image classifications.

9. The system of claim 7, wherein the image feature extractor module extracts an image feature vector by generating a plurality of features corresponding to each pixel of a plurality of pixels of the digital image, wherein each feature of the plurality of features comprises a plurality of feature descriptor values and corresponds to a feature type from among a plurality of feature types; and the feature descriptor values of each feature of the plurality of features of each pixel of the plurality of pixels are determined based on data from the digital image.

\* \* \* \* \*